(12) United States Patent
Mitsushita (10) Patent No.: US 6,460,063 B1
(45) Date of Patent: Oct. 1, 2002

(54) DIVISION CIRCUIT AND GRAPHIC DISPLAY PROCESSING APPARATUS

(75) Inventor: Tatsumi Mitsushita, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/253,951

(22) Filed: Feb. 22, 1999

(30) Foreign Application Priority Data

Feb. 24, 1998 (JP) .......................................... 10-042436

(51) Int. Cl.[7] ................................................ G06F 7/52
(52) U.S. Cl. ...................................................... 708/502
(58) Field of Search ............................... 708/504, 654

(56) References Cited

U.S. PATENT DOCUMENTS

| | | | | |
|---|---|---|---|---|
| 5,220,524 A | * | 6/1993 | Hesson | 708/654 |
| 5,249,149 A | * | 9/1993 | Cocanougher et al. | 708/504 |
| 5,563,818 A | * | 10/1996 | Agarwal et al. | 708/504 |
| 5,768,170 A | * | 6/1998 | Smith | 708/504 |

* cited by examiner

Primary Examiner—David H. Malzahn
(74) Attorney, Agent, or Firm—Rader, Fishman & Grauer PLLC; Ronald P. Kananen, Esq.

(57) ABSTRACT

A division circuit which can shorten a critical path for division and can perform the division at a high speed, provided with a 1's complement processor for outputting a complement of 1 of a divisor when the divisor is negative; an adder for adding "1" to the output from the complement processor and making the result of addition an absolute value; a priority encoder for calculating a logarithmic value comprised of an integer value of a logarithm of 2 of the value output from the 1's complement processor, a shift processor for shifting the absolute value in accordance with the logarithmic value, making the shift processing value a mantissa when the MSB of the shift processing value is "1", and making the shift processing value with an MSB replaced by "1" the mantissa when the MSB of the shift processing value is "0", and a subtractor for determining the shift amount in response to the MSB of the shift processing value of the shift processor.

13 Claims, 5 Drawing Sheets

FIG. 5 PRIOR ART

DIVISION CIRCUIT AND GRAPHIC DISPLAY PROCESSING APPARATUS

BACKGROUND OF THE INVENTION

1. Field of the Invention

The present invention relates to a division circuit and a graphic display processing apparatus capable of performing processing at a high speed.

2. Description of the Related Art

Computer graphics are often used in a variety of computer aided design (CAD) systems and amusement machines. Especially, along with the recent advances in image processing techniques, systems using three-dimensional computer graphics are becoming rapidly widespread.

In three-dimensional computer graphics, the color value of each pixel is calculated at the time of deciding the color of each corresponding pixel. Then, rendering is performed for writing the calculated value to an address of a display buffer (frame buffer) corresponding to the pixel.

One of the rendering methods is polygon rendering. In this method, a three-dimensional model is expressed as an composite of triangular unit graphics (polygons). By drawing the polygons as units, the colors of the pixels of the display screen are decided.

In polygon rendering, coordinates (x, y, z), color data (R, G, B, α), homogeneous coordinates (s, t) of texture data indicating a composite image pattern, and a value of the homogeneous term q for the respective vertexes of the triangle in a physical coordinate system are input and processing is performed for interpolation of these values inside the triangle.

Here, the homogeneous term q is, simply stated, like an expansion or reduction rate. Coordinates in a UV coordinate system of an actual texture buffer, namely, texture coordinate data (u, v), are comprised of the homogeneous coordinates (s, t) divided by the homogeneous term q to give "s/q" and "t/q" which in turn are multiplied by texture sizes USIZE and VSIZE, respectively.

In a three-dimensional computer graphic system using such polygon rendering, the texture data is read from the texture buffer when drawing, and texture mapping is performed for applying the read texture data on the surface of the three-dimensional model.

Note that when texture mapping is performed on a three-dimensional model, the expansion/reduction rate of the image indicated by the texture data to be applied to each pixel changes.

The texture buffer is accessed by using the above texture coordinate data (u, v). At the time of reading the texture data from the texture buffer, "s/q" and "t/q" are calculated for all pixels to calculate the texture coordinate data (u, v). Accordingly, the number of division operations becomes enormous.

Note that in the three-dimensional computer graphic system of the related art, the above "s/q" and "t/q" are calculated by a division circuit explained below.

Below, the division circuit of the related art will be explained.

Figure 4:
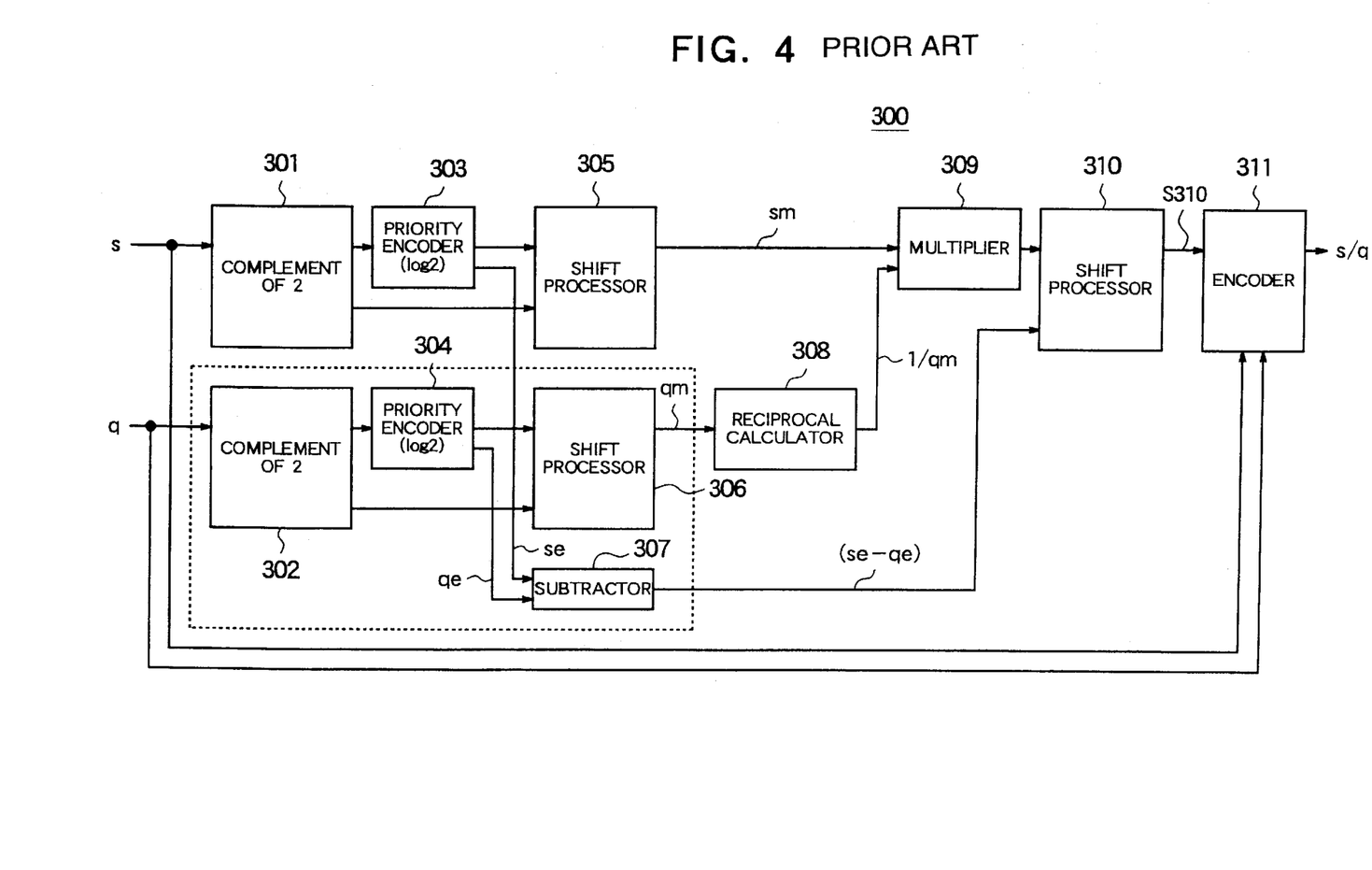
FIG. 4 is a view of the configuration of an example of a division circuit of the related art.

FIG. 4 is a view of the configuration of an example of a division circuit 300 of the related art.

As shown in FIG. 4, the division circuit 300 comprises absolute value processors 301 and 302, priority encoders 303 and 304, shift processors 305 and 306, a subtractor 307, a reciprocal calculator 308, a multiplier 309, a shift processor 310, and an encoder 311.

In the division circuit 300, the absolute value of a dividend s is normalized as shown in the equation (1) below for floating point representation of the input dividend s. When the sign of the dividend s is minus (negative), its index se and mantissa sm are generated based on the following equations (2) and (3).

$$s = sm \times 2^{se} \quad (1)$$

$$sm = (\sim s+1)/\{2^{**}int(\log_2(\sim s+1))\} \quad (2)$$

Note that equation (2) is an operation for shifting "~s+1" by exactly a complement of 1 of "int($\log_2$(~s+1))" that is, "~int($\log_2$(~s+1))", toward the most significant bit (MSB).

$$se = int\{\log_2(\sim s+1)\} \quad (3)$$

Figure 5:
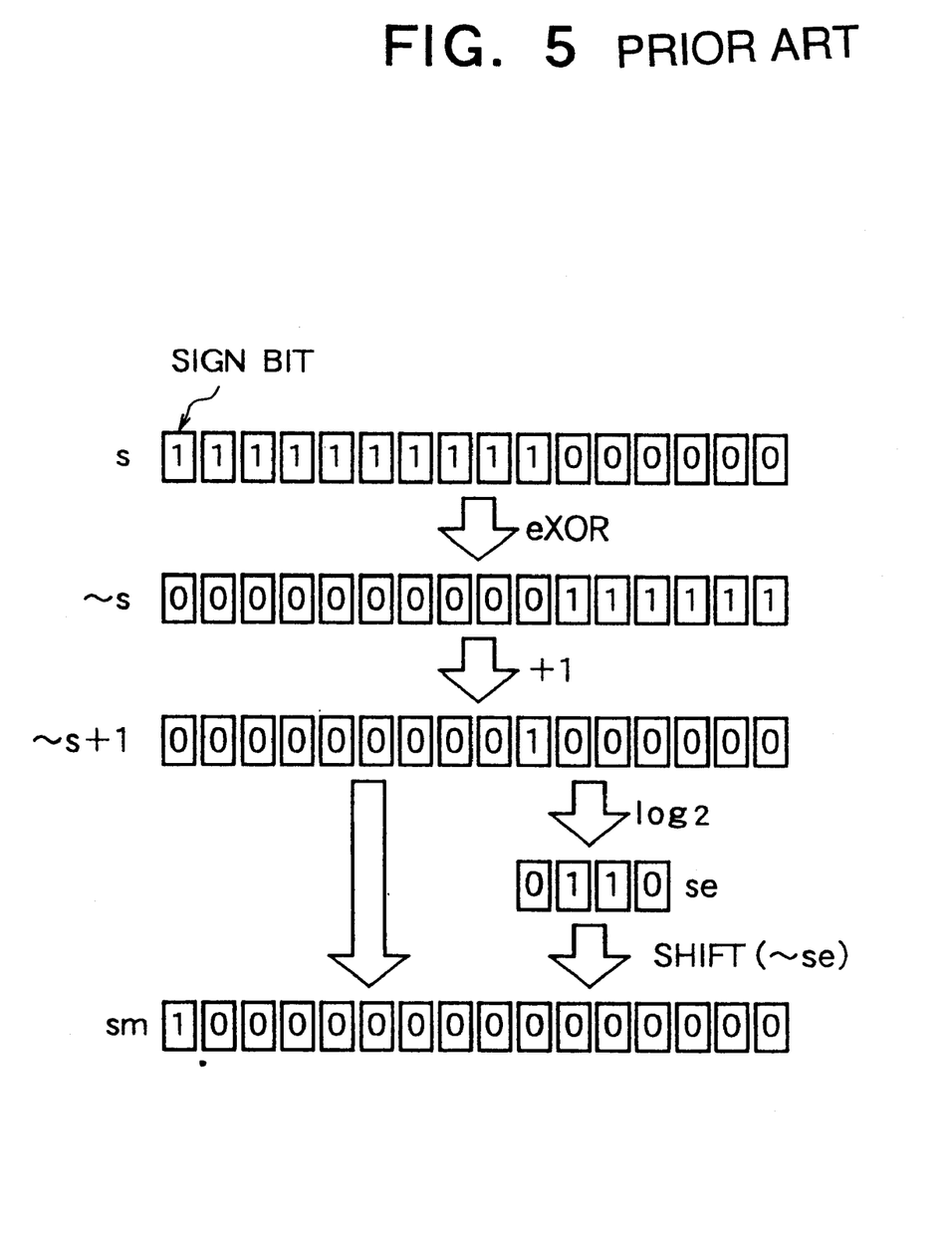
FIG. 5 is a view of the flow of operations for finding a mantissa sm and an index se when a dividend s is negative in the division circuit shown in FIG. 4.

Specifically, when the sign of the dividend s is minus, as shown in FIG. 5, the absolute value processor 301 shown in FIG. 4 calculates an inversion of the dividend s (Exclusive-OR), adds "+1" to the inversion result, finds a complement of 2 of the dividend s, that is, "~s+1", and outputs the "~s+1" to the priority encoder 303 and the shift processor 305.

Note that, in the absolute number processor 301, the sign of the dividend s refers to a sign bit of the MSB of the dividend s. The sign is judged to be minus when the MSB is "1" and plus when the MSB is "0".

A logarithm of 2 of "~s+1", that is, "$\log_2$(~s+1)", is found in the priority encoder 303. A integer value of the logarithm of 2, that is, "$\log_2$(~s+1)", is output as an index se to the shift processor 305 and subtractor 307.

Then, the shift processor 305 shifts "~s+1" by exactly the complement of 1 of "int($\log_2$(~s+1))", that is, "~int($\log_2$(~s+1))", that is, the complement of 1 of the index se, toward the MSB to calculate the mantissa sm. The mantissa sm is output to the multiplier 309.

Also, in the above division circuit 300, when the sign of the dividend s is plus (positive), the absolute value processor 301, the priority encoder 303, and the shift processor 305 normalize the absolute value of the input dividend s and generate its index se and mantissa sm based on the following equations (4) and (5):

$$sm = s/\{2^{**}int(\log_2 s)\} \quad (4)$$

Note that equation (4) is an operation for shifting "s" by exactly the complement of 1 of "int($\log_2 s$)", that is, "~int($\log_2 s$)", toward the MSB.

$$se = int(\log_2 s) \quad (5)$$

Specifically, when the sign of the dividend s is plus, the dividend s passes through the absolute value processor 301 and is output to the priority encoder 303 and the shift processor 305.

Then, the priority encoder 303 finds the logarithm of 2 of the dividend s, that is, "$\log_2 s$". The integer value of the logarithm of 2, that is, "$\log_2 s$", that is, "int($\log_2 s$)", is output as the index se to the shift processor 305 and the subtractor 307.

Then, the shift processor 305 shifts the dividend s by exactly the complement of 1 of "int($\log_2 s$)", that is, "~int ($\log_2 s$)", toward the MSB and calculates the mantissa sm. The mantissa sm is output to the multiplier 309.

Figure 1:
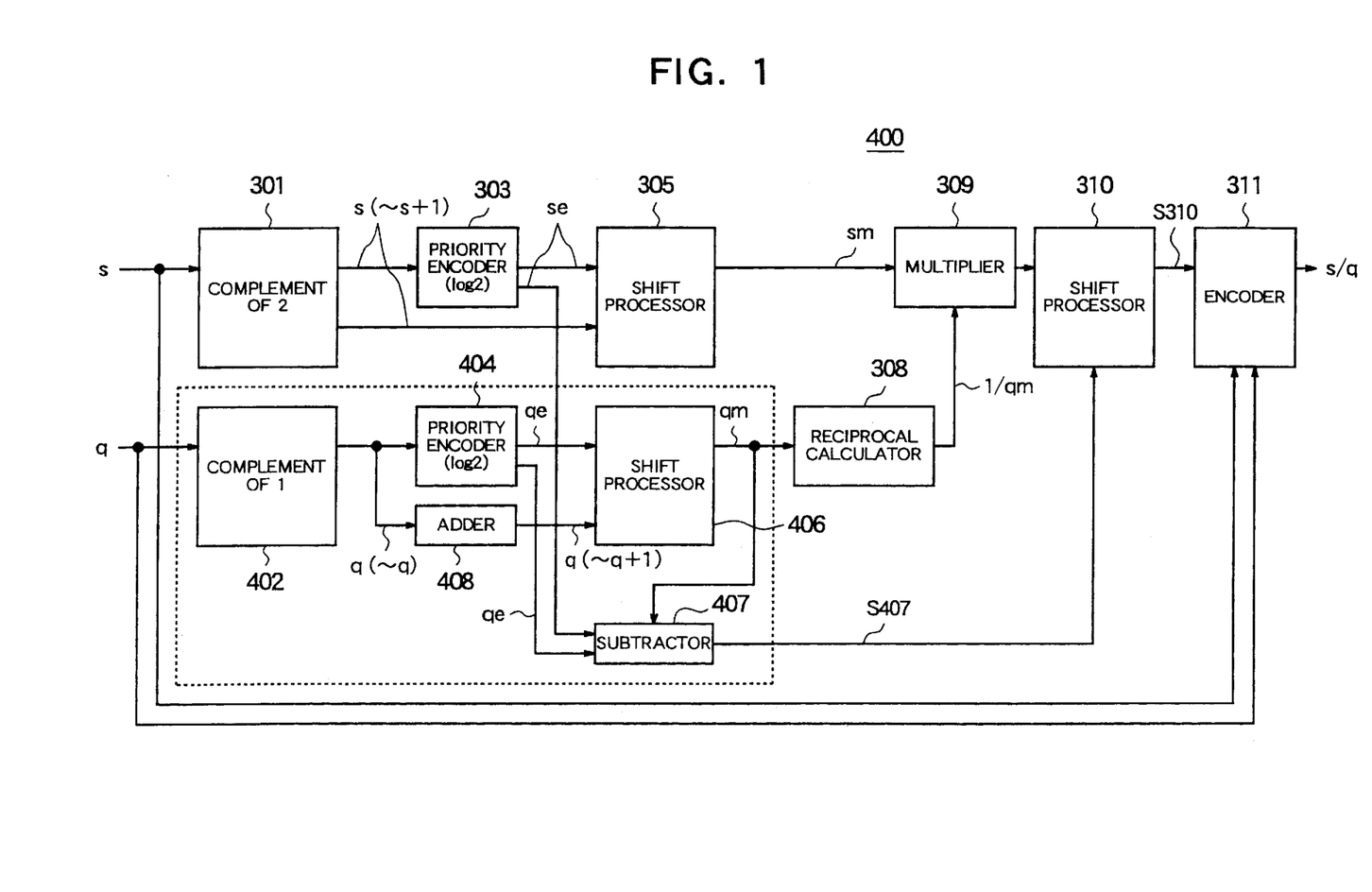
FIG. 1 is a view of the configuration of a division circuit according to an embodiment of the present invention.

The absolute value processor 302, the priority encoder 304, and the shift processor 306 shown in FIG. 1 are used for calculating the index qe and mantissa qm of the divisor q. The processing is the same as that of the above absolute value processor 301, priority encoder 303, and shift processor 305.

The reciprocal calculator 308 calculates the reciprocal of the mantissa qm of the divisor q and outputs the reciprocal "1/qm" to the multiplier 309.

The multiplier 309 multiplies the mantissa sm and the reciprocal of the mantissa qm, that is, "1/qm", and outputs the multiplication result "sm/qm" to the shift processor 310.

The subtractor 307 subtracts the index qe from the index se and outputs the subtraction result "se−qe" to the shift processor 310.

The shift processor 310 shifts the multiplication result "sm/qm" from the multiplier 309 by exactly the number of bits indicated by the subtraction result "se−qe" from the subtractor 307 toward the MSB and outputs the shift operation result S310 to the encoder 311.

The encoder 311, based on the sign of the dividend s and the sign of the divisor q, adds "1" indicating minus to the one upper bit of the MSB of the shift operation result S310 when the two signs are different and outputs the result as the division result "s/q". When the sign of the dividend s and the sign of the divisor q are the same, the encoder 311 adds "0" indicating plus to the one upper bit of the MSB of the shift operation result S310 and outputs the result as the division result "s/q".

Summarizing the problem to be solved by the invention, in the above division circuit 300 of the related art shown in FIG. 4, the processing time of the path for finding "1/qm" from the divisor q is longer than the path for finding the mantissa sm from the dividend s by the amount of the processing in the reciprocal calculator 308. Therefore, in the multiplier 309, the processing is suspended after receiving the mantissa sm as an input until receiving "1/qm" as an input. Namely, the path for obtaining "1/qm" from the divisor q is a critical path of the operation in the division circuit 300.

Such suspension of the operation has a large effect on the above three-dimensional computer graphic system which calculates "s/q" and "t/q" for all pixels. This creates a bottleneck in increasing the speed of movement and improving the picture quality of the three-dimensional image displayed on a cathode ray tube (CRT).

SUMMARY OF THE INVENTION

An object of the present invention is to provide a division circuit which can perform division at a high speed by shortening the critical path of the division.

Another object of the present invention is to provide a graphic display processing apparatus which can increase a speed of movement and improve a picture quality of a three-dimensional image displayed on a display device.

To attain the above objects, according to a first aspect of the present invention, there is provided division circuit performing a $\log_2$ operation on complements of a dividend and divisor to calculate indexes for each, shifting the complements by the indexes, then calculating a reciprocal value of the result of shifting of the complement of the divisor by a reciprocal processing means, multiplying the result of shifting of the dividend with the calculated reciprocal value, shifting the multiplication result by exactly a shift amount corresponding to the indexes of the dividend and divisor, and calculating a result of division in a digital form, said division circuit comprising a complement processing means for outputting a complement of 1 of the divisor when the divisor is negative; an adding means for adding "1" to the output from the complement processing means and making the result of addition an absolute value when the divisor is negative; a logarithm processing means for calculating a logarithm of 2 of an output value of the complement processing means and calculating an integer value of the calculated logarithm; a shift processing means for shifting the absolute value according to the integer value; an MSB replacing means for making the calculation value of the shift processing means a mantissa when the MSB of the calculation value is "1", making the calculation value with an MSB replaced with "1" the mantissa when the MSB of the calculation value is "0", and outputting the mantissa to the reciprocal processing means; and a shift amount determining means for subtracting the integer value from the index of the dividend when the MSB of the calculation result of the shift processing means is "1", subtracting the integer value plus "1" from the index of the dividend when the MSB of the calculation result of the shift processing means is "0", and making the result of subtraction the shift amount.

Preferably, the operation in the adding means and the operation in the logarithm processing means are performed in parallel.

In the division circuit of the first aspect of the present invention, a complement of, for example, 2 is calculated for the divisor first, a logarithm of 2 is calculated for the complement of 2, and an index is calculated. Next, the complement of 2 is shifted by the index and a mantissa of the dividend is calculated.

In parallel with the above calculation for finding the mantissa of the dividend, a complement of 1 of the divisor is calculated by the complement processing means when the divisor is negative.

Next, the adding means adds 1 to the complement of 1 calculated by the above complement processing means. The result becomes the absolute number of the divisor.

Also, in parallel with the above calculation in the adding means, a logarithm processing means calculates an integer value of a logarithm of 2 of the complement of 1 calculated in the above complement processing means.

Next, a shift processing means shifts the absolute value of the divisor in accordance with the above integer value.

Next, in the MSB rewrite means, when the MSB of the calculation value of the above shift processing means is "1", the calculation value is set as a mantissa of the divisor. When the MSB of the calculation value is "0", the calculation value with the MSB replaced by "1" is set as the mantissa of the dividend. Then the mantissa of the above dividend is output to the reciprocal processing means.

In the shift amount determination means, when the MSB of the calculation value of the shift processing means is "1", the above integer value is subtracted from the index of the above dividend. When the MSB of the calculation value of the shift processing means is "0", an addition value obtained by adding "1" to the above integer value is subtracted from the index of the above dividend. The subtraction result is made the shift amount.

Next, in the reciprocal processing means, the reciprocal value of the mantissa of the dividend is calculated.

Then, the mantissa of the dividend and the reciprocal value of the mantissa output from the above reciprocal processing means are multiplied. The multiplication result is shifted by exactly the above shift amount to calculate the division result.

According to a second aspect of the present invention, there is provided a division circuit performing multiplication between a dividend and a reciprocal of a divisor by a floating point system, comprising a first absolute value processing means for outputting a complement of 2 of the dividend as a first absolute value when the dividend is negative and outputting the dividend as the first absolute value when the dividend is positive; a first logarithm processing means for calculating a logarithm of 2 of the first absolute value and calculating an integer value of the calculated logarithm as a first logarithmic; a first shift processing means for shifting the first absolute value by exactly an inverse value of the first logarithmic value toward an MSB to calculate a first mantissa; a complement processing means for outputting a complement of 1 of the divisor when the divisor is negative and outputting the divisor when the divisor is positive; an adding means for outputting an output from the complement processing means plus "1" as a second absolute value when the divisor is negative and outputting an output from the complement processing means as the second absolute value when the divisor is positive; a second logarithm processing means for calculating a logarithm of 2 of the output of the complement processing means and calculating an integer value of the calculated logarithm as a second logarithmic; a second shift processing means for shifting the second absolute value by exactly an inverse value of the second logarithmic value toward an MSB; an MSB replacing means for outputting a calculation result of the second shift processing means as a second mantissa when the MSB of the calculation result is "1" and outputting the calculation value with an MSB replaced by "1" as the second mantissa when the MSB of the calculation value is "0"; a subtracting means for subtracting the second logarithmic value from the first logarithmic value when the MSB of the calculation result of the second shift processing means is "1" and subtracting the second logarithmic value plus "1" from the first logarithmic value when the MSB of the calculation result of the second shift processing means is "0"; a reciprocal processing means for calculating a reciprocal of the second mantissa; a multiplying means for multiplying the first mantissa by the reciprocal of the second mantissa; and a third shift processing means for shifting a result of multiplication of the multiplying means by exactly a result of subtraction of the subtracting means toward the MSB.

Preferably, the operation In the adding means and the operation in the second logarithm processing means are performed in parallel.

According to a third aspect of the present invention, there is provided a graphic display processing apparatus expressing a three-dimensional model by a composite of unit graphics, dividing homogeneous coordinates (s,t) by a homogeneous term q by a division circuit of the first aspect of the invention, reading texture data indicating a pattern to be added to the unit graphics from a storing means by using a texture address according to s/q and t/q of the result of the division to draw a graphic, and determining a color of each pixel, the division circuit performing a $\log_2$ operation on complements of a dividend and divisor to calculate indexes for each, shifting the complements by the indexes, then calculating a reciprocal value of the result of shifting of the complement of the divisor by a reciprocal processing means, multiplying the result of shifting of the dividend with the calculated reciprocal value, shifting the multiplication result by exactly a shift amount corresponding to the indexes of the dividend and divisor, and calculating a result of division in a digital form, the division circuit comprising: a complement processing means for outputting a complement of 1 of the divisor when the divisor is negative; an adding means for adding "1" to the output from the complement processing means and making the result of addition an absolute value when the divisor is negative; a logarithm processing means for calculating a logarithm of 2 of an output value of the complement processing means and calculating an integer value of the calculated logarithm; a shift processing means for shifting the absolute value according to the integer value; an MSB replacing means for making the calculation value of the shift processing means a mantissa when the MSB of the calculation value is "1", making the calculation value with an MSB replaced with "1" the mantissa when the MSB of the calculation value is "0", and outputting the mantissa to the reciprocal processing means; and a shift amount determining means for subtracting the integer value from the index of the dividend when the MSB of the calculation result of the shift processing means is "1", subtracting the integer value plus "1" from the index of the dividend when the MSB of the calculation result of the shift processing means is "0", and making the result of subtraction the shift amount.

According to a fourth aspect of the present invention, there is provided a graphic display processing apparatus comprising a storing means for storing texture data comprised of image data to be added to a unit graphic forming a basic unit for expressing a shape for display; a polygon rendering data generating means for generating polygon rendering data including three-dimensional coordinates (x,y, z), R (red), G (green), B (blue) data, homogeneous coordinates (s,t), and a homogeneous term q for vertexes of the unit graphic; a pixel location judging means for judging whether each of a plurality of pixels to be simultaneously processed is located inside the unit graphic and generating validity indication data indicating validity when the pixel is located inside the unit graphic; an interpolation data generating means for interpolating polygon rendering data of vertexes of the unit graphic to generate interpolation data of a pixel located inside the unit graphic by; and a texture processing means for performing an operation for dividing homogeneous coordinates (s,t) included in the interpolation data of a pixel for which the validity indication data indicates validity, among the plurality of pixels to be simultaneously processed, by a homogeneous term q to produce "s/q" and "t/q" by a division circuit according to the first aspect of the invention and reading texture data from the storing means by using a texture address according to the "s/q" and the "t/q"; the division circuit of the texture processing means is a division circuit performing a $\log_2$ operation on complements of a dividend and divisor to calculate indexes for each, shifting the complements by the indexes, then calculating a reciprocal value of the result of shifting of the complement of the divisor by a reciprocal processing means, multiplying the result of shifting of the dividend with the calculated reciprocal value, shifting the multiplication result by exactly a shift amount corresponding to the indexes of the dividend and divisor, and calculating a result of division in a digital form, the division circuit comprising: a complement processing means for outputting a complement of 1 of the divisor when the divisor is negative; an adding means for adding "1" to the output from the complement processing means and making the result of addition an absolute value when the divisor is negative; a logarithm processing means for calculating a logarithm of 2 of an output value of the complement processing means and calculating an integer value of the calculated logarithm; a shift processing means for shifting the absolute value according to the integer value; an MSB replacing means for making the calculation value of the shift processing means a mantissa when the MSB of the calculation value is "1", making the calculation value with an MSB replaced with "1" the mantissa when the MSB of the calculation value is "0", and outputting the mantissa to the reciprocal processing means; and a shift amount determining means for subtracting the integer value from the index of the dividend when the MSB of the calculation result of the shift processing means is "1", subtracting the integer value plus "1" from the index of the dividend when the MSB of the calculation result of the shift processing means is "0", and making the result of subtraction the shift amount.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

First Embodiment

Below, a division circuit according to an embodiment of the present invention will be explained.

FIG. 1 is a view of the configuration of a division circuit 400 of the present embodiment.

In the division circuit 400, the absolute value of the dividend s is normalized as shown In the above equation (1) for floating point representation of an input dividend s. When the sign of the dividend s is minus (negative), its index se and mantissa sm are generated based on the above equations (2) and (3). When the sign is plus (positive), the index se and mantissa sm are generated based on the above equations (4) and (5).

Further, in the division circuit 400, the absolute value of the divisor q is normalized as shown in the equation (6) below for floating point representation of the input divisor q. When the sign of the divisor q is minus (negative), the index qe and the mantissa qm are generated based on equations (7) and (8) below:

$$q = qm \times 2^{qe} \quad (6)$$

$$qm = (\sim q+1)/\{2^{**}int(\log_2(\sim q))\} \quad (7)$$

Note that equation (7) is an operation for shifting "~q+1" by exactly the complement of 1 of "int(log$_2$(~q))", that is, "~int(log$_2$(~q))", toward the MSB.

Note also that in equation (7), when the MSB of the mantissa qm is "0", the MSB is replaced by "1".

$$qe = int\{\log_2(\sim q)\} + adj \quad (8)$$

Note that in equation (8), "adJ" becomes "1" when the MSB of the mantissa qm shown in equation (7) is "0", while becomes "0" when the MSB of the mantissa qm is "1".

Also, in the division circuit 400, when the sign of the divisor q is plus (positive), the input absolute number of the divisor q is normalized, and its index qe and mantissa qm are generated based on equations (9) and (10) below:

$$qm = q/\{2^{**}int(\log_2 q)\} \quad (9)$$

Note that equation (9) is an operation for shifting the "q" by exactly the complement of 1 of "int(log$_2$q)", that is, "~int(log$_2$q)", toward the MSB.

$$qe = int\{\log_2 q\} \quad (10)$$

Below, the configuration of the division circuit 400 for performing the above operations will be explained.

As shown in FIG. 1, the division circuit 400 comprises an absolute value processor 301, a priority encoder 303, a shift processor 305, a reciprocal calculator 308, a multiplier 309, a shift processor 310, an encoder 311, a 1's complement calculator, a priority encoder 404, a shift processor 406, a subtractor 407, and an adder 408.

In FIG. 1, the absolute value processor 301, the priority encoder 303, the shift processor 305, the reciprocal calculator 308, the multiplier 309, the shift processor 310, and the encoder 311 are the same as shown in FIG. 4.

The 1's complement calculator 402 refers to a sign bit of the MSB of, for example, the divisor q. When the divisor q is positive (when the sign bit is "0"), it outputs the divisor q to the priority encoder 404. Also, the 1's complement calculator 402 calculates the complement of 1 of the divisor q, that is, its inversion (EXOR), when the divisor q is negative (when the sign bit is "1") and outputs the calculation result "~q" to the priority encoder 404 and the adder 408.

The priority encoder 404 obtains the logarithm of 2 of the divisor q input from the 1's complement calculator 402, that is, "log$_2$q", when the divisor q is positive and outputs the integer value "int(log$_2$q)" to the shift processor 406 and subtractor 407 as the index qe.

The priority encoder 404 obtains the logarithm of 2 of the calculation result "~q" input from the 1's complement calculator 402, that is, "log$_2$(~q)", and outputs its integer value "int(log$_2$(~q))" to the shift processor 406 and the subtractor 407 as an index qe.

The adder 408 outputs "q" input from the 1's complement calculator 402 to the shift processor 406. Also, the adder 408 adds "1" to "~q" input from the 1's complement calculator 402 when the divisor is negative and outputs the addition result "~q+1" to the shift processor 406.

The shift processor 406 calculates the mantissa qm when the divisor q is positive by shifting the "q" input from the adder 408 by exactly the complement of 1 of "int(log$_2$q)" input from the priority encoder 404, that is, "~int(log$_2$q)", that is, the complement of 1 of the index qe, toward the MSB, then outputs the mantissa qm to the reciprocal calculator 309.

Also, the shift processor 406 obtains the mantissa qm by shifting "~q+1" input from the adder 408 by exactly the complement of 1 of "int(log$_2$(~s))" input from the priority encoder 404, that is, "~int(log$_2$(~s))", that is, the complement of 1 of the index qe, toward the MSB and outputs the mantissa qm to the reciprocal calculator 309.

The subtractor 407 subtracts the index qe input from the priority encoder 404 from the index se input from the priority encoder 303 when the divisor is positive and outputs the subtraction result "se−sq" to the shift processor 310 as a shift amount S407.

Also, the subtractor 407 refers to the MSB of the mantissa am input from the shift processor 406 when the divisor q is negative. When the MSB is "1", the subtractor 407 subtracts the index qe input from the priority encoder 404 from the index se input from the priority encoder 303 and outputs the subtraction result "se−qe" to the shift processor 310 as a shift amount S407. When the referred MSB is "0", the subtractor 407 subtracts the index qe', that is, the index qe input from the priority encoder 404 added with the adj(=1), from the index se input from the priority encoder 303. The subtractor 407 outputs the subtraction result "se−(qe+adj)" to the shift processor 310 as a shift amount S407.

The reciprocal calculator 308 calculates the reciprocal of the mantissa qm input from the shift processor 406 "1/qm" when the divisor q is positive and outputs the reciprocal "1/qm" to the multiplier 309.

Also, when the divisor q is negative and the MSB of the mantissa qm input from the shift processor 406 is "1", the reciprocal calculator 308 calculates the reciprocal "1/qm" and outputs the same to the multiplier 309. When the divisor q is negative and the MSB of the mantissa qm input from the shift processor 406 is "0", the reciprocal calculator 308 sets the MSB to "1", calculates the reciprocal "1/qm", and outputs the same to the multiplier 309.

The multiplier 309 multiplies the mantissa sm from the shift processor 305 and the mantissa "1/qm" from the reciprocal calculator 308 and outputs the multiplication result "sm/qm" to the shift processor 310.

The shift processor 310 shifts the multiplication result "sm/qm" from the multiplier 309 by exactly the shift amount S407 toward thee MSB and outputs the shift operation result S310 to the encoder 311.

The encoder 311, based on the signs of the dividend s and the divisor q, adds "1" indicating negative to the one upper bit of the MSB of the shift operation result S310 when the two signs are different. Then the encoder 311 outputs the result as the division result "s/q". On the other hand, the encoder 311 adds "0", indicating a positive value to the one upper bit of the MSB of the shift operation result S310 when the signs of the dividend and the divisor q are same and outputs the same as the division result "s/q".

Below, the operations of the division circuit 400 will be explained.

Here, an example where the dividend s and the divisor q are both negative will be explained.

The absolute value processor 301 calculates "~s+1" by adding "1" to the complement of 1 of the input dividend s, that is, "~s" and outputs "~s+1" to the priority encoder 303 and the shift processor 305.

Next, the priority encoder 303 finds the logarithm of 2 of the dividend s, that is, "$\log_2 s$" and outputs the integer value of its logarithm of 2 "$\log_2 s$", that is, "int($\log_2 s$)", as the index se to the shift processor 305 and the subtractor 407.

Next, the shift processor 305 shifts the dividend s by exactly the complement of 1 of the index se toward the MSB to calculate the mantissa sm. The mantissa sm is output to the multiplier 309.

Namely, as shown In FIG. 5, four steps (clock cycles) are required from input of the dividend s to the division circuit 400 to the calculation of the mantissa sm, that is, the 1's complement operation, addition operation, $\log_2$ operation, and shift operation.

Figure 2:
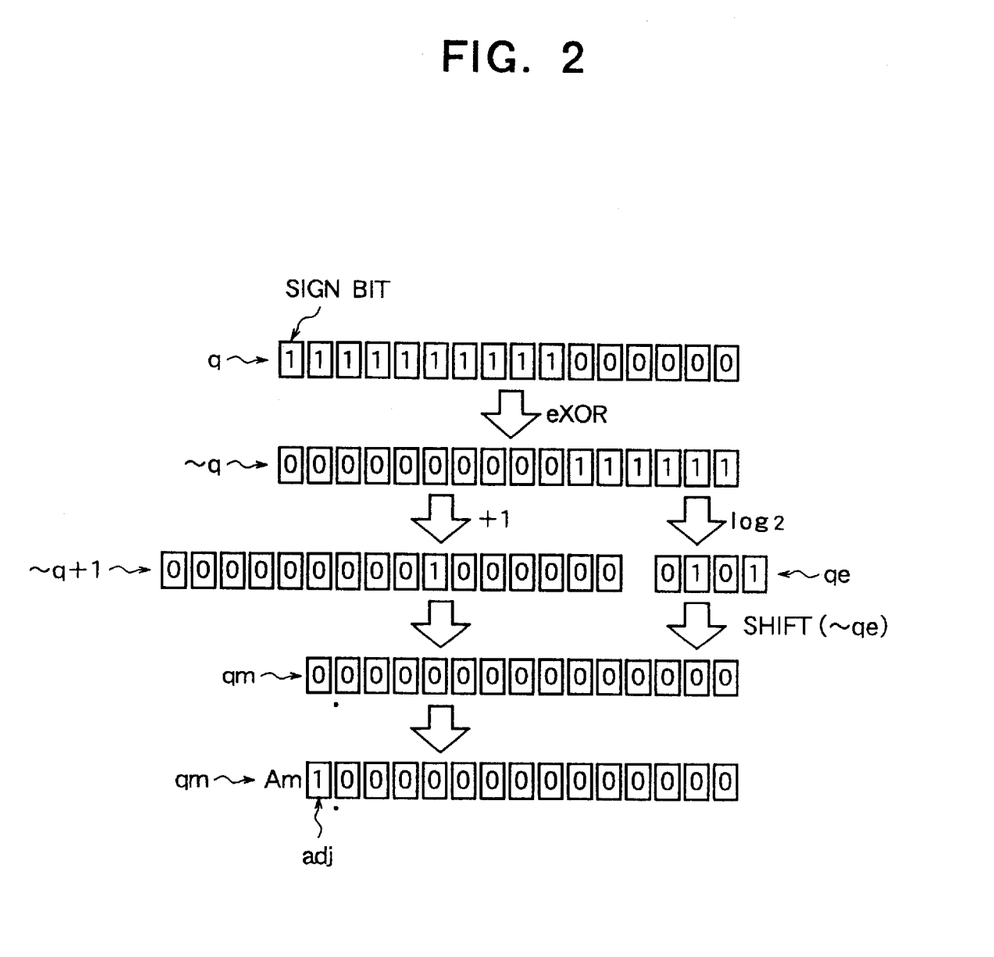
FIG. 2 is a view of the flow of the operations for finding a mantissa qm and an index qe when a dividend g is negative in the division circuit shown in FIG. 1.

Also, as shown in FIG. 2, the complement of 1 of the divisor q input from the 1's complement calculator 402, that is, "~q", is calculated in the 1's complement calculator 402 and output to the priority encoder 404 and the adder 408.

Next, as shown in FIG. 2, the logarithm of 2 of "~q", that is, "log2(~q)", is obtained in the priority encoder 404. Then, the integer value of its logarithm of 2 "log2(~q)", that is, "int(log2(~q))", is output as the index qe to the shift processor 406 and the subtractor 407.

At the same time, as shown in FIG. 2, the adder 408 adds "1" to the "~q" from the 1's complement calculator 402 and outputs the addition result "~q+1" to the shift processor 406.

Next, the shift processor 406, as shown in FIG. 2, shifts the "~q+1" input from the adder 408 by exactly the complement of 1 of the index qe input from the priority encoder 404 toward the MSB to obtain the mantissa qm. The mantissa qm is output to the reciprocal calculator 308 and the subtractor 407.

The subtractor 407 refers to the MSB of the mantissa input from the shift processor 406. As shown in FIG. 2, since the MSB is "0", the index qe', that is, the index qe input from the priority encoder 404 added with the adj (=1), is subtracted from the index se input from the priority encoder 303. The subtraction result "se−(qe+adj)" is output as a shift amount S407 to the shift processor 310.

Also, the reciprocal calculator 308 refers to the MSB of the mantissa am input from the shift processor 406. Since the MSB is "0", as shown in FIG. 2, the MSB of the mantissa qm is set to be "1", and the reciprocal of the mantissa qm after setting "1", that is, "1/qm", is calculated and output to the multiplier 309.

Namely, as shown in FIG. 2, five steps are carried out from the input of the divisor q to the division circuit 400 to the calculation of the reciprocal "1/qm", that is, the 1's complement operation, addition of 1 operation and $\log_2$ operation, shift operation, processing for setting "1" as the MSB of qm, and the reciprocal operation. The processing for setting "1" as the MSB of qm, however, can be ignored. Therefore, four clock cycles are required from the input of the divisor q until calculating the reciprocal "1/qm", that is, the 1's complement operation, addition of 1 operation and $\log_2$ operation, shift operation, and reciprocal operation.

As a result, the multiplier 309 shown in FIG. 1 can simultaneously receive as input the mantissa sm from the shift processor 305 and the reciprocal "1/qm" from the reciprocal calculator 308 so there is substantially no waiting time.

Next, the multiplier 309 multiplies the mantissa sm from the shift processor 305 and the mantissa "1/qm" from the reciprocal calculator 308 and outputs the multiplication result "sm/qm" to the shift processor 310.

Next, the multiplication result "sm/gm" is shifted in the shift processor 310 by exactly the shift amount S407 toward the MSB and the shift operation result S310 is output to the encoder 311.

In the encoder 311, based on the sign of the dividend s and the sign of the divisor q, since the two signs are different, "1" indicating negative is added to the one upper bit of the MSB of the shift operation result S310. The result is output as a division result "s/q".

As explained above, according to the division circuit 400, when the dividend s and the divisor q are negative, the time for waiting for the input of the reciprocal "1/qm" in the multiplier 309 can be eliminated so high speed processing can be realized.

Note that in the above operation, an example where the divisor q was negative was explained, however, even in the case where the divisor q is positive, since the critical path to calculate the reciprocal "1/qm" after the input of the divisor q can be reduced by one step, it is possible to realize a higher speed processing than the division circuit 300 shown in FIG. 4.

Also, the division circuit 400 can realize higher speed operation with substantially the same circuit scale as the division circuit 300 shown in FIG. 4.

Second Embodiment

Below, in the second embodiment, a case of applying the division circuit of the present invention to the three-dimensional computer graphic system which displays a desired three-dimensional image of any three-dimensional object model on a display such as a CRT, which is often used for home game machines, will be explained.

Figure 3:
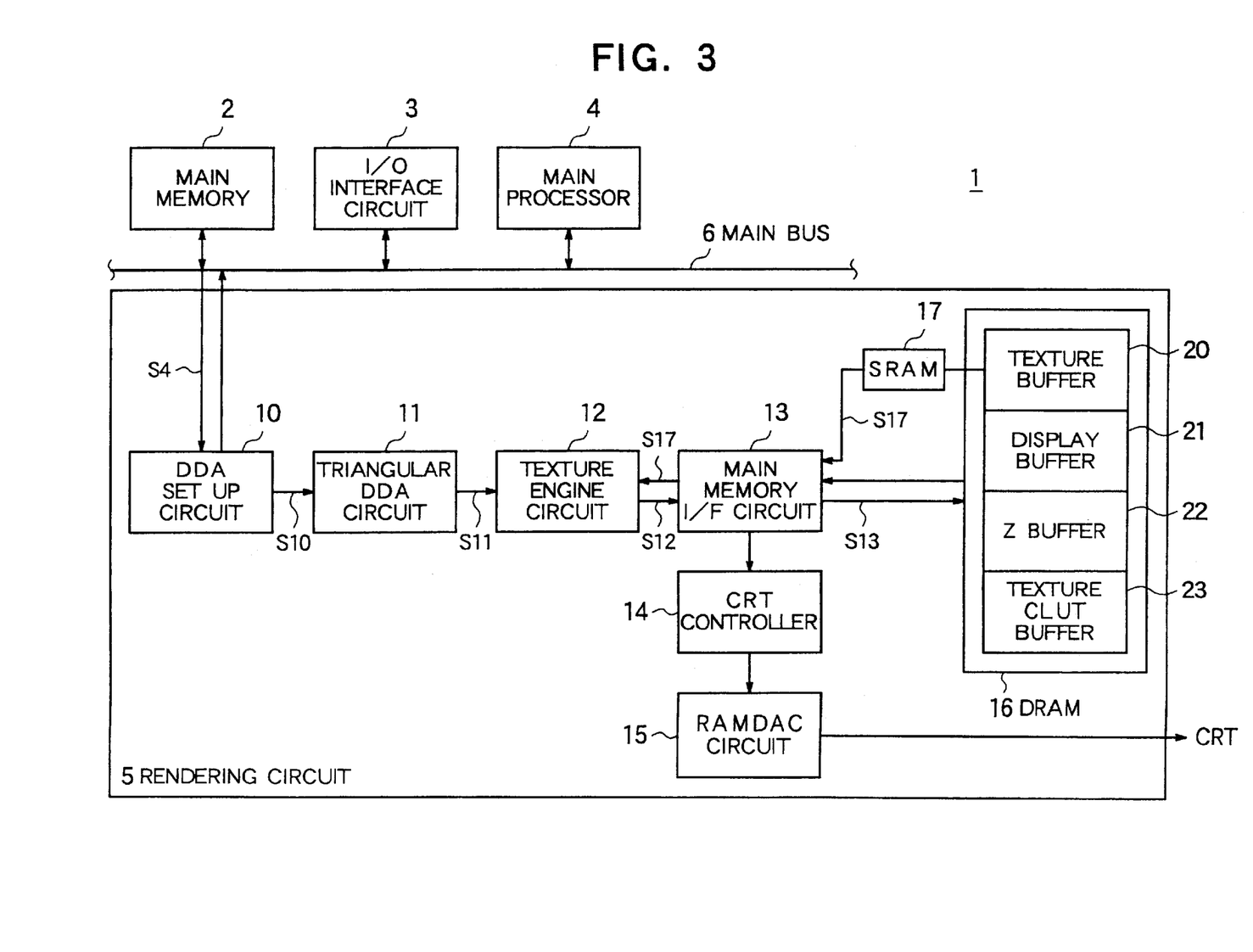
FIG. 3 is a view of the system configuration of a three-dimensional computer graphic system of a second embodiment of the present invention.

FIG. 3 is a view of the system configuration of a three-dimensional computer graphic system 1 of the present embodiment.

In the three-dimensional computer graphic system 1, a three-dimensional model is expressed by a composite of triangular unit graphics (polygons). By drawing the polygons, this system can decide the color of each pixel on the display screen and perform polygon rendering for display on the screen.

In the three-dimensional computer graphic system 1, a three-dimensional object is expressed by using a z-coordinate for indicating the depth in addition to the (x, y) coordinates for indicating positions on a two-dimensional plane. Any one point of the three dimensional space can be expressed by the three coordinates (x, y, z).

As shown in FIG. 3, in the three-dimensional computer graphic system 1, a main memory 2, an I/O interface circuit 3, a main processor 4, and a rendering circuit 5 are connected via a main bus 6.

Below, the operations of the respective components will be explained.

The main processor 4, for example, in accordance with the state of progress in a game, reads the necessary graphic data from the main memory 2, performs clipping, lighting, geometrical processing, etc. on the graphic data and generates polygon rendering data. The main processor 4 outputs the polygon rendering data S4 to the rendering circuit 5 via the main bus 6.

The I/O interface 3 receives as input the polygon rendering data from the outside in accordance with need and outputs the same to the rendering circuit via the main bus 6.

Here, the polygon rendering data includes data of each of the three vertexes (x, y, z, R, G, B, α, s, t, q, F) of the polygon.

Here, the (x, y, z) data indicates the three-dimensional coordinates of a vertex of the polygon, and (R, G. B) data indicates the luminance values of red, green, and blue at the three-dimensional coordinates, respectively.

The data α indicates a coefficient of blending the R, G, B data of a pixel to be drawn and that of a pixel already stored in the display buffer 21.

Among the (s, t, q) data, the (s, t) indicates homogeneous coordinates of a corresponding texture and the q indicates the homogenous term. Here, the texture size USIZE and VSIZE are respectively multiplied with the "s/q" and "t/q" to obtain coordinate data (u, v) of the texture. The texture coordinate data (u, v) is used for accessing the texture data stored in the texture buffer 20.

The F data indicates an α value of fogging.

Namely, the polygon rendering data indicates physical coordinate values of the vertexes of a triangle and values of colors of the vertexes, texture, and fogging.

The rendering circuit 5 will be explained in detail below.

As shown in FIG. 3, the rendering circuit 5 comprises a digital differential analyzer (DDA) set-up circuit 10, a triangle DDA circuit 11, a texture engine circuit 12, a memory interface (I/F) circuit 13, a cathode ray tube (CRT) controller circuit 14, a random access memory (RAM) DAC circuit 15, a dynamic random access memory (DRAM) 16, and a static random access memory (SRAM) 17.

The DRAM 16 functions as a texture buffer 20, a display buffer 21, a z-buffer 22, and a texture CLUT buffer 23.

DDA Set-up Circuit 10

The DDA set-up circuit 10 performs linear interpolation of the values of the vertexes of the triangle on the physical coordinates in a triangle DDA circuit 11 in its latter part. The DDA set-up circuit 10, prior to obtaining information of the color and depth of the respective pixels inside the triangle, performs a set-up operation for obtaining the sides of the triangle and the difference in a horizontal direction for the data (z, R, G, B, α, s, t, q, F) indicated by the polygon rendering data S4.

Specifically, this set-up operation uses values of the starting point and the ending point and the distance between the two points to calculate the variation of the value to find movement for a unit length.

The DDA set-up circuit 10 outputs the calculated variation data S10 to the triangle DDA circuit 11.

Triangle DDA Circuit 11

The triangle DDA circuit 11 uses the variation data input from the DDA set-up circuit 10 to calculate the (z, R, G, B, α, s, t, q, F) data after linear interpolation of each pixel inside the triangle.

The triangle DDA circuit 11 outputs the data (x, y) for each pixel and the (z, R, G, B, α, s, t, q, F) data at the (x, y) coordinates to the texture engine circuit 12 as DDA data (interpolation data) S11.

In the present embodiment, the triangle DDA circuit 11 outputs the DDA data S11 of 8 (=2×4) pixels positioned inside a block being processed in parallel to the texture engine circuit 12.

Texture Engine Circuit 12

The texture engine circuit 12 performs the calculation of "s/q" and "t/q", calculation of the texture coordinate data (u, v), reading of the data (R, G, B, α) from the texture buffer 20, and α blending successively in a pipeline format.

Note that the texture engine circuit 12 performs the processing on the 8 pixels positioned inside a predetermined block simultaneously in parallel.

The texture engine circuit 12 performs the operation for dividing the data s by the data q and the operation for dividing the data t by the data q.

The texture engine circuit 12 is provided with eight of the division circuits 400 shown in FIG. 1 of the above first embodiment and performs the division "s/q" and "t/q" simultaneously on the 8 pixels.

Also, the texture engine 12 respectively multiplies the texture sizes USIZE and VSIZE with the division results "s/q" and "t/q" to generate the texture coordinate data (u, V).

The texture engine circuit 12 outputs a reading request including the generated texture coordinate data (u, v) to the SRAM 17 or DRAM 16 via the memory I/F circuit 13. As the result the texture engine circuit 12 obtains the data S17 (R, G, B, α) stored at the texture address corresponding to the data (s, t) by reading the texture data stored in the SRAM 17 or in the texture buffer 20 via the memory I/F circuit 13.

Here, a copy of the texture data stored in the texture buffer 20 is stored in the SRAM 17.

The texture engine circuit 12 generates pixel data S12 by blending the (R, G, B) data in the read data S17 (R, G, B, α) and the (R, G, B) data included in the DDA data S11 from the triangle DDA circuit 11 in the former stage by the ratio indicated by the a data (texture α) included in the data S17 (R, G, B, α).

The texture engine circuit 12 outputs the pixel data S12 to the memory I/F circuit 13.

Note that in the texture buffer 20, texture data corresponding to a plurality of reducing rates of MIPMAP (textures for a plurality of resolutions) is stored. Here, texture data of which reducing rate to use is determined for the above triangular unit using a predetermined algorithm.

In the case of a full color mode, the texture engine circuit 12 directly uses the data (R, G, B, α) read from the texture buffer 20. In the case of an index color mode, the texture engine circuit 12 reads a color look-up table (CLUT), prepared in advance, from the texture CLUT buffer 23, transfers and stores the same in the built-in SRAM, and uses the color loop-up table to obtain the data (R, G, B) corresponding to the color index read from the texture buffer 20.

Memory I/F Circuit 13

The memory I/F circuit 13 compares the z-data corresponding to the pixel data S12 input from the texture engine circuit 12 with the z-data stored in the z-buffer 22 and judges whether the image drawn by the input pixel (image) data S12 is positioned closer to the viewing point than the image written in the display buffer 21 the previous time. When it is judged that the image drawn by the input pixel data S12 is positioned closer, the memory I/F circuit 13 updates the z-data stored in the buffer 22 by the z-data corresponding to the pixel data S12 and updates the pixel data in the display buffer 21 by the pixel data S12.

Also, the memory I/F circuit 13, in accordance with need, blends the (R, G, B) data included in the image data S12 and the (R, G, B) data already stored in the display buffer 21 by the blending ratio indicated by the α data corresponding to the pixel data S12, that is, α blending. Then, the memory I/F circuit 13 writes the data (R, G, B) after blending to the display buffer 21.

Note that the DRAM 16 is simultaneously accessed by the memory I/F circuit 13 for 16 pixels.

CRT Controller Circuit 14

The CRT controller circuit 14 generates an address for display on a CRT not shown in synchronization with the given horizontal and vertical synchronization signals and outputs a request for reading the display data from the display buffer 21 to the memory I/F circuit 13. In response to this request, the memory I/F circuit 13 reads a certain amount of the display data from the display buffer 21. The CRT controller 14 has a built-in FIFO circuit for storing the display data read from the display buffer 21 and outputs the index value of RGB to the RAMDAC circuit 15 at certain time intervals.

RAMDAC Circuit 15

The RAMDAC circuit 15 stores the R, G, B data corresponding to the respective index values, transfers the R. G. B data in a digital form corresponding to the index value of RGB input from the CRT controller 14, and generates RGB data in an analog form. The RAMDAC circuit 15 outputs the generated R, G, B data to the CRT.

The operation of the three-dimensional computer graphic system 1 will be explained below.

Polygon rendering data S4 is output from the main processor 4 to the DDA set-up circuit 10 via the main bus 6. Variation data S10 indicating the sides of the triangle and the difference in a horizontal direction etc. is generated in the DDA set-up circuit 10.

This variation data S10 is output to the triangle DDA circuit 11. In the triangle DDA circuit 11, the linearly interpolated data (z, R, G, B, α, s, t, q, F) for each pixel inside the triangle is calculated. Then, the calculated (z, R, G, B, α, s, t, q, F) data and the (x, y) data of the vertexes of the triangle are output from the triangle DDA circuit to the texture engine circuit 12 as DDA data S11.

Next, the texture engine circuit 12 performs the operation for dividing the data s by the data q and the operation for dividing the data t by data q for the data (s, t, q) indicated by the DDA data S11.

At this time, the division "s/q" and "t/q" are simultaneously carried out for 8 pixels by eight division circuits 400 shown in FIG. 1. Then, the texture sizes USIZE and VSIZE are respectively multiplied with the division results "s/q" and "t/q" to generate the texture coordinate data (u, v).

Next, a request for reading including the above generated texture coordinate data (u, v) is output from the texture engine circuit 12 to the SRAM 17 via the memory I/F circuit 13. Then, the data S17 (R, G, B, α) stored in the SRAM 17 is read via the memory I/F circuit 13.

Next, in the texture engine circuit 12, the data (R, G, B) in the read data S17 (R, G, B, α) and the (R, G, B) data included in the DDA data S11 from the triangle DDA circuit 11 in the former stage are blended by the ratio indicated by the α data (texture α) included in the data S17 (R, G, B, α) to generate the pixel data S12.

This pixel data S12 is output from the texture engine circuit 12 to the main memory I/F circuit 13.

Then, in the memory I/F circuit 13, the z-data corresponding to the pixel data input from the texture engine circuit 12 and the z-data stored in the z-buffer 22 are compared. When the image drawn by the input pixel data S12 is judged to be positioned closer to the viewing point than the image drawn in the display buffer the previous time, the z-data stored in the z-buffer 22 is updated by the z-data corresponding to the image data S12.

In the memory I/F circuit 13, in accordance with need, the (R, G, B) data included in the image data S12 and the (R, G, B) data already stored in the display buffer 21 are blended by the ratio indicated by the α data corresponding to the pixel data S12. Then the blended data (R, G, B) is written to the display buffer 21.

As explained above, according to the three-dimensional computer graphic system 1, the division for obtaining "s/q" and "t/q" in the texture engine circuit 12 is performed by using the above division circuit 400 shown in FIG. 1.

As a result, the division "s/q" and "t/q" can be performed at a higher speed, and the movement of the three-dimensional image displayed on the CRT can be increased in speed and the,picture quality can be improved.

Note that the present invention is not limited to the above embodiments and includes modifications within the scope of the claims.

For example, in the division circuit shown in FIG. 1, a case of provision of a sign adder 311 was explained, however, it is not necessary to provide the sign adder 311 for realizing the function of calculation of the absolute value of s/q.

Also, in the above three-dimensional computer graphic system 1 shown in FIG. 3, an example of a configuration comprising an SRAM 17 was given; however, it may be configured without the SRAM 17.

Also, the texture buffer 20 and the texture CLUT buffer 23 shown in FIG. 3 can be provided outside the DRAM 16.

Further, in the three-dimensional computer graphic system 1, though a case where the geometric processing for generating the polygon rendering data was performed in the main processor 4 was explained, the processing can be performed in the rendering circuit 5.

Summarizing again the effects of the invention, as explained above, according to the division circuit of the present invention, the critical path for division can be made shorter and the processing speed can be improved without substantially enlarging the circuit.

Also, according to the graphic display processing apparatus of the present invention, the movement of the three-dimensional image displayed on the display screen can be increased in speed and the picture quality can be improved.

What is claimed is:

1. A division circuit that performs a $\log_2$ operation on complements of a divided and divisor to calculate indexes for each, shifts said complements by said indexes, then calculates a reciprocal value of the result of shifting of said complement of the divisor by a reciprocal processing means, multiplies the result of shifting of said divided with the calculated reciprocal value, shifts the multiplication result by exactly a shift amount corresponding to the indexes of the divided and divisor, and calculates a result of division in a digital form, said division circuit comprising:

a complement processing means for outputting a complement of 1 of the divisor when the divisor is negative;

an adding means for adding "1" to the output from the complement processing means and making the result of the adding operation an absolute value when the divisor is negative;

a logarithm processing means for calculating a logarithm of 2 of an output value of said complement processing means and calculating an integer value of the calculated logarithm;

a shift processing means for shifting said absolute value according to said integer value;

a MSB replacing means for making a calculation value of the shift processing means a mantissa when the MSB of the calculation value is "1", making the calculation value with a MSB replaced by "1" the mantissa when the MSB of the calculation value is "0", and outputting the mantissa to the reciprocal processing means; and a shift amount determining means for subtracting said integer value from said index of said divided when the MSS of the calculation result of said shift processing means is "1", subtracting said integer value plus "1" from said index of said divided when the MSB of the calculation result of said shift processing means is "0", and making the result of subtraction said shift amount.

2. The division circuit as set forth in claim 1, wherein said adding means and said logarithm processing means operate in parallel.

3. The division circuit as set forth in claim 1, further comprising a 2's complement processing means for calculating the 2's complement of the dividend and for making the calculated 2's complement the complement of the dividend when the dividend is negative.

4. The division circuit as set forth in claim 1, wherein said shift processing means shifts the absolute value by exactly an inverse value of the integer value toward the MSB.

5. The division circuit as set forth in claim 1, further comprising a sign determining means for determining a sign based on the MSBs of the dividend and the divisor and adding a sign bit in accordance with the determined sign to the MSB of the division result.

6. A division circuit that performs multiplication between a dividend and a reciprocal of a divisor by a floating point system, said division circuit comprising:

a first absolute value processing means for outputting a 2's complement of said dividend as a first absolute value when said dividend is negative and outputting said dividend as the first absolute value when said dividend is positive;

a first logarithm processing means for calculating a logarithm of 2 of said first absolute value and calculating an integer value of the calculated logarithm as a first logarithmic value;

a first shift processing means for shifting said first absolute value by exactly an inverse value of said first logarithmic value toward an MSB to calculate a first mantissa;

a complement processing means for outputting a 1's complement of said divisor when said divisor is negative and out putting said divisor when said divisor is positive;

an adding means for outputting an output from said complement processing means plus "1" as a second absolute value when said divisor is negative and outputting an output from said complement processing means as the second absolute value when said divisor is positive;

a second logarithm processing means for calculating a logarithm of 2 of the output of the complement processing means and calculating an integer value of the calculated logarithm as a second logarithm value;

a second shift processing means for shifting said second absolute value by exactly an inverse value of said second logarithmic value toward an MSB;

a MSB replacing means for outputting a calculation result of said second shift processing means as a second mantissa when the MSB of said calculation result is "1" and outputting the calculation value with a MSB replaced by "1" as the second mantissa when the MSB of said calculation value is "0";

a subtracting means for subtracting said second logarithmic value from said first logarithmic value when the MSB of said calculation result of said second shift processing means is "1" and subtracting the second logarithmic value plus "1" from said first logarithmic value when the MSB of said calculation result of said second shift processing means is "0";

a reciprocal processing means for calculating a reciprocal of said second mantissa;

a multiplying means for multiplying said first mantissa by the reciprocal of the second mantissa; and a third shift processing means for shifting a result of multiplication of said multiplying means by exactly a result of subtraction of said subtracting means toward the MSB.

7. The division circuit as set forth in claim 6, wherein said adding means and said second logarithm processing means operate in parallel.

8. The division circuit as set forth in claim 6, further comprising a sign determining means for determining a sign based on the MSBs of the dividend and the divisor and adding a sign bit in accordance with the determined sign to the MSB of the calculation result of the third shift processing means.

9. A graphic display processing apparatus that expresses a three-dimensional model by a composite of unit graphics, divides homogeneous coordinates (s,t) by a homogeneous term q in a division circuit, reads texture data indicating a pattern to be added to said unit graphics from a storing means by using a texture address according to s/q and t/q of the division result to draw a graphic, and determines a color of each pixel;

said division circuit performing a $\log_2$ operation on complements of a dividend and divisor to calculate indexes for each, shifting said complements by said indexes, then calculating a reciprocal value of the shifting result of said complement of the divisor by a reciprocal processing means, multiplying the shifting result of said dividend with the calculated reciprocal value, shifting the multiplication result by exactly a shift amount corresponding to the indexes of the dividend and divisor, and calculating a division result in a digital form, said division circuit comprising:

a complement processing means for outputting a 1's complement of the divisor when the divisor is negative;

an adding means for adding "1" to the output from the complement processing means and making the result of addition an absolute value when the divisor is negative;

a logarithm processing means for calculating a logarithm of 2 of an output value of said complement processing means and calculating an integer value of the calculated logarithm;

a shift processing means for shifting said absolute value according to said integer value;

a MSB replacing means for making the calculation value of the shift processing means a mantissa when the MSB of the calculation value is "1", making the calculation value with a MSB replaced by "1" the mantissa when the MSB of the calculation value is "0", and outputting the mantissa to the reciprocal processing means; and a shift amount determining means for subtracting said integer value from said index of said dividend when the MSB of the calculation result of said shift processing means is "1", making the calculation value with a MSB of the calculation value is "0", and outputting the mantissa to the reciprocal processing means; and a shift amount determining means for subtracting said integer value from said index of said dividend when the MSB of the calculation result of said shift processing means is "1", subtracting said integer value plus "1" from said index of said dividend when the MSB of the calculation result of said shift processing means is "0", and making the subtraction result said shift amount.

10. The graphic display processing apparatus as set forth in claim 9, wherein said adding means and said logarithm processing means operate in parallel.

11. The graphic display processing apparatus as set forth in claim 9, wherein said shift processing means shifts the absolute value by exactly an inversion value of said integer value toward the MSB.

12. The graphic display processing apparatus as set forth in claim 9, further comprising a plurality of said division circuits that simultaneously calculate "s/q" and "t/q" for a plurality of pixels.

13. A graphic display processing apparatus comprising:

a storing means for storing texture data containing image data to be added to a unit graphic forming a basic unit for expressing a shape for display;

a polygon rendering data generating means for generating polygon rendering data including three-dimensional coordinates (x,y,z), R (red), G(green), B (blue) data, homogeneous coordinates (s,t) and a homogeneous term q for vertexes of said unit graphic;

a pixel location judging means for judging whether each of a plurality of pixels to be simultaneously processed is located inside said unit graphic and generating validity indication data indicating validity when the pixel is located inside said unit graphic;

an interpolation data generating means for interpolating polygon rendering data of vertexes of said unit graphic to generate interpolation data of a pixel located inside said unit graphic; and a texture processing means for performing an operation for dividing homogeneous coordinates (s,t) included in said interpolation data of a pixel for which said validity indication data indicates validity, among the plurality of pixels to be simultaneously processed, by a homogeneous term q to produce "s/q" and "t/q" by a division circuit and reading texture data from the storing means by using a texture address according to said "s/q" and said "t/q";

wherein said division circuit of said texture processing means is a division circuit that performs a $\log_2$ operation on complements of a dividend and divisor to calculate indexes for each, shifts said complements by said indexes, then calculates a reciprocal value of the shifting result of said complement of the divisor by a reciprocal processing means, multiplies the result of shifting of said dividend with the calculated reciprocal value, shifts the multiplication result by exactly a shift amount corresponding to the indexes of the dividend and divisor, and calculates a result of division in a digital form, said division circuit comprising:

a complement processing means for outputting a 1's complement of the divisor when the divisor is negative;

an adding means for adding "1" to the output from the complement processing means and making the result of addition an absolute value when the divisor is negative;

a logarithm processing means for calculating a logarithm of 2 of an output value of said complement processing means and calculating an integer value of the calculated logarithm;

a shift processing means for shifting said absolute value according to said integer value;

a MSB replacing means for making the calculation value of the shift processing means a mantissa when the MSB of the calculation value is "1", making the calculation value with a MSB replaced by "1" the mantissa when the MSB of the calculation value is "0", and outputting the mantissa to the reciprocal processing means; and a shift amount determining means for subtracting said integer value from said index of said dividend when the MSB of the calculation result of said shift processing means is "1", subtracting said integer value plus "1" from said index of said dividend when the MSB of the calculation result of said shift processing means is "0", and making the subtraction result said shift amount.

* * * * *